(12) United States Patent
Mercado et al.

(10) Patent No.: US 6,698,649 B2
(45) Date of Patent: Mar. 2, 2004

(54) DESOLDER APPARATUS

(75) Inventors: Emory M Mercado, Baguio (PH); Eric P. Velasquez, Pozorrubio (PH); Arthur Allan Bayot, Baguio (PH); Emmanuel A. Evangelista, Virac (PH)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/034,341

(22) Filed: Dec. 28, 2001

(65) Prior Publication Data

US 2003/0121960 A1 Jul. 3, 2003

(51) Int. Cl.[7] ............................................. B23K 1/018
(52) U.S. Cl. ...................... 228/264; 228/191; 228/119
(58) Field of Search ................................ 228/191, 264, 228/13, 19, 20.5

(56) References Cited

U.S. PATENT DOCUMENTS 3,684,151 A  *  8/1972  Burman et al. ............... 228/19
4,759,491 A  *  7/1988  Fisher .................... 228/180.21
5,065,931 A  * 11/1991  Liu et al. ..................... 228/19
6,360,934 B1 *  3/2002  Cilia et al. ................... 228/19
6,464,124 B2 * 10/2002  Wark ........................... 228/19

FOREIGN PATENT DOCUMENTS

JP          2-5047    *  1/1990
JP       2001-7509    *  1/2003

* cited by examiner

Primary Examiner—M. Alexandra Elve
Assistant Examiner—Len Tran
(74) Attorney, Agent, or Firm—Frederick J. Telecky, Jr.; W. James Brady, III

(57) ABSTRACT

Apparatus and methods for removing solder ball connections from electrical circuits are disclosed. The apparatus and methods comprise a solder ball removing tool 20 having a multiplicity of raised ribs 22 defining a contact surface 24 and made up of heat conductive material having a melting point above the melting point of solder. There is also included a heating source 30 for heating at least a portion of the multiplicity of raised ribs 22 to a temperature sufficient to melt the solder and yet below the melting temperature of the conductive material. The tool 20 is preferably supported or constructed such that the contact surface is tilted so that the melted solder will run down the raised ribs into a collecting pan 46.

21 Claims, 3 Drawing Sheets

DESOLDER APPARATUS

FIELD OF THE INVENTION

This invention relates generally to apparatus and methods for removing solder ball connections from a backside of a circuit, such as a flip-chip package having elements attached by solder ball connections, and more specifically, to methods and apparatus for reworking such circuits having one or more defects related to the solder ball connections.

BACKGROUND OF THE INVENTION

Circuit elements are often attached to a support board or circuit by solder ball connections. As will be appreciated by those skilled in the art, if one or more of the solder ball connections receives too much solder or somehow the solder is smeared or otherwise disturbed before the solder hardens, a solder connection may be created between two or more adjacent solder ball connections thereby causing a short and subsequent rejection of the circuit for being defective. Such defects historically have resulted in a yield ratio of about 99.2%, which although a seemingly high yield rate, still results in thousands of dollars of rejects every day. Increasing the yield rate by as little as a half of a point would typically cut the losses due to such defective solder ball connection to less than half of that presently experienced.

SUMMARY OF THE INVENTION

In the preferred embodiment, the present invention provides methods and apparatus for removing solder ball connections from electrical circuits. The methods and apparatus comprise a solder ball-removing tool that has a multiplicity of raised ribs that define a contact surface. The raised ribs may take substantially any shape, but one effective embodiment is simply paralleled raised ribs that are spaced from each other at a distance somewhat greater than the average diameter of a solder ball connection. The raised ribs define a contact surface and are made of a heat conductive material, such as for example, aluminum, copper or iron or alloys of such metals. Thus, any suitable heat conductive material is satisfactory so long as the melting point of the material is well above that of the solder that is to be removed.

Also included is a heat source for heating at least a portion, if not all, of the multiplicity of raised ribs to a temperature that is sufficiently great to melt the solder connections, yet less than the melting point of the heat conductive ribs. Also included is a support structure for supporting the solder ball-removing tool at an angle tilted to the horizontal. Alternately, the support structure may support the solder ball-removing tool horizontally, while the raised ribs will be higher at one end and shorter at the other end to create the tilt effect.

Also as will be appreciated by those skilled in the art, a suitable tool for picking up and holding the individual chips to be reworked on the soldering tool may comprise a vacuum holding tool such that the circuit can be placed against the heated contact surface of the raised ribs. The circuit is then held against the tilted surface of the contact surface until it is heated to a level that the solder ball connections begin to melt. At that point, the circuit is moved back and forth across the edges of the raised ribs to knock off the solder, which then flows down the ribs to a collecting pan or container at the bottom of the lower end of the raised ribs.

According to a preferred embodiment, a flux material such as WS-600, commercially available from the Alpha-metals Corporation in Singapore, is used. To assure a full removal of the solder ball connections, it is advisable to repeat the applying of the flux and heating and rubbing steps at least one more time.

BRIEF DESCRIPTION OF THE DRAWINGS

The above-mentioned features as well as other features of the present invention will be clearly understood from the consideration of the following description in connection with accompanying drawings in which.

DESCRIPTION OF PREFFERED EMBODIMENTS

Figure 1:
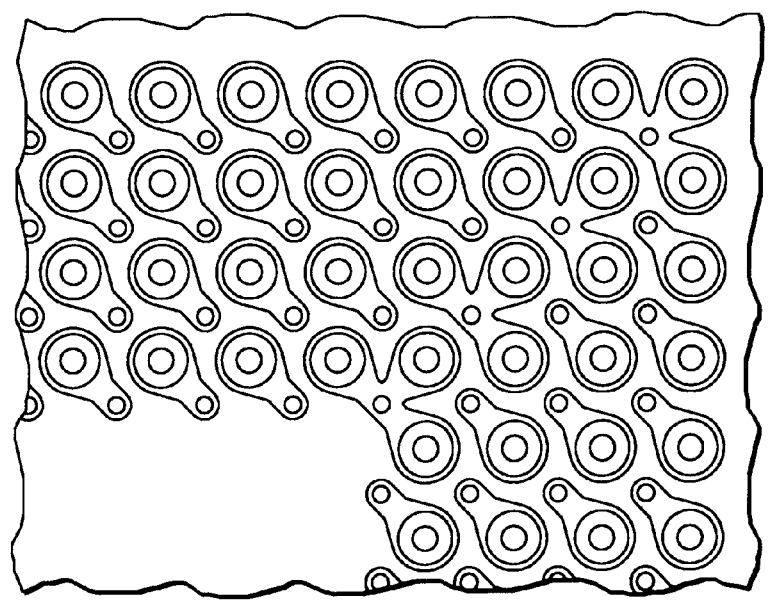
FIG. 1 shows the backside of a circuit board having circuit elements attached by solder ball connections.
Figure 1A:
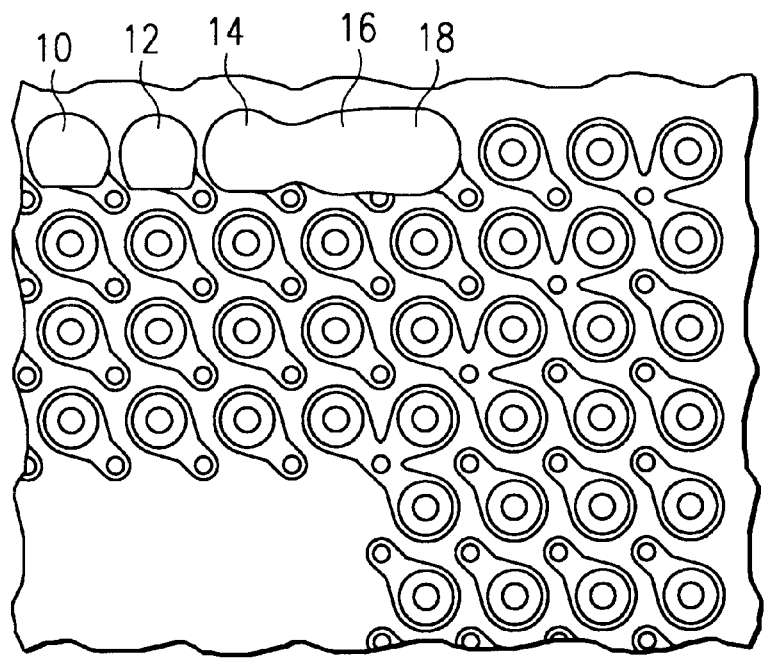
FIG. 1a shows a circuit similar to FIG. 1 wherein one or more of the solder ball connections are defective in that they are shorted to an adjacent connection.

Referring now to FIG. 1, the figure illustrates the backside of a circuit that includes a multiplicity of acceptable solder ball connections (i.e., with no defective connections). FIG. 1a, on the other hand, shows a similar unit that has two questionable solder ball connections, 10 and 12. These connections are oversized, and although they do not appear to be shorted to any other connections, may still be classified as defective. There are also three additional solder ball connections, 14, 16 and 18, which are clearly defective in that the solder for the three connections has been smeared to the point that the solder for these three connections has flowed or merged together which of course means that the connections points 14, 16 and 18 are all shorted together. Therefore, the circuit or flip-chip package of FIG. 1a is clearly unacceptable and must be rejected, and thus will have negative effect on the yield rate of the process.

However, if all of the solder ball connections of the defective package can be removed, another attempt can be made to provide the chip with new solder ball connections that do not include any defective connections. Testing and evaluation of the rework process of this invention indicates that the process is sufficiently effective to raise the yield rate from 99.2% to 99.7%, which results in significant dollar savings.

Figure 2:
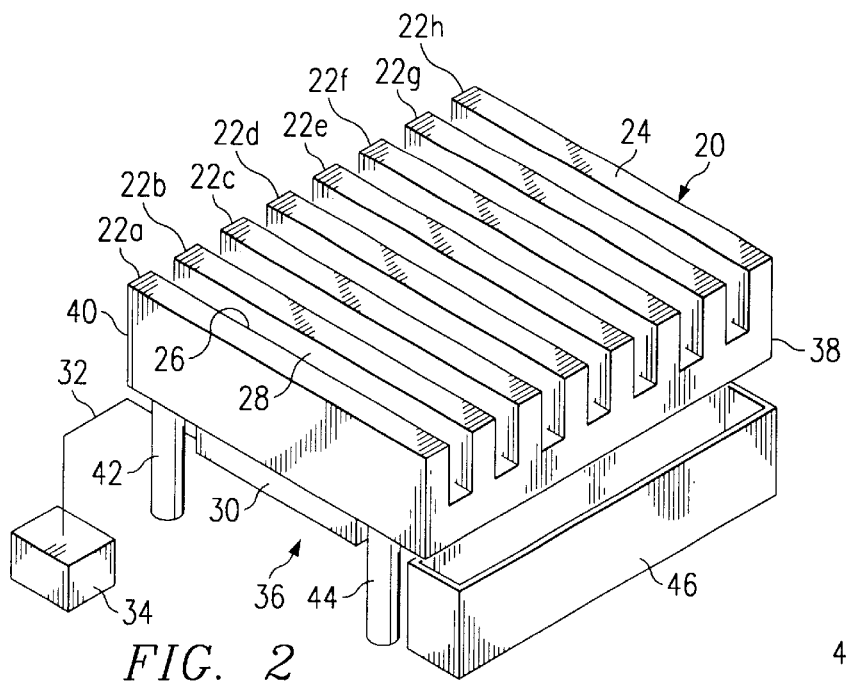
FIGS. 2 and 2a show a perspective and side view respectively of a first embodiment of the apparatus of the present invention.
Figure 2A:
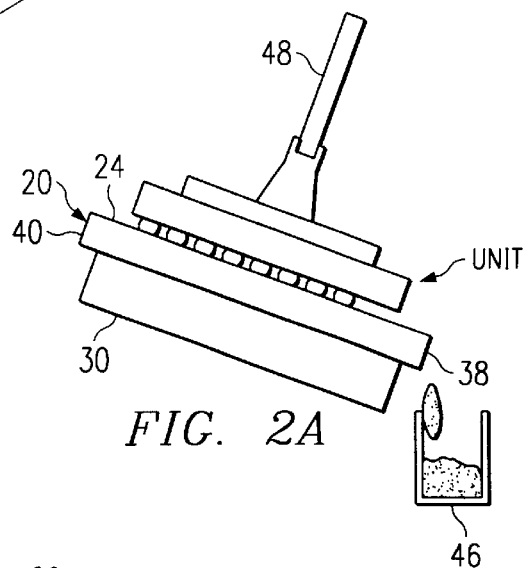

FIG. 2 shows a first embodiment of the apparatus of the invention. As shown, there is a solder ball removing or rework tool 20 having a multiplicity of parallel ribs 22a through 22h, preferably spaced at a distance that is greater than the diameter of the individual solder ball connection. The top surfaces of the raised ribs 22a through 22h, such as top surface 24 of rib 22h, define a contact surface or plane, and as will be discussed below, transfer heat from the rework tool 20 to the circuit or flip-chip that is to be reworked.

The rework tool 20 provides sufficient heat to melt and remove the solder ball connections. It will be appreciated that the rework tool 20 is made from a heat conductive material. Also, since the edges, such as edge 26 on raised rib 22a and edge 28 on raised rib 22b are rubbed against the melted solder balls of the circuit being reworked, they will preferably be made of a hard material with squared off edges. Therefore, it will be appreciated that the rework tool 20 is preferably made of a reasonably hard, heat conductive metal such as aluminum, copper, iron or selected alloys of these materials. Other materials could alternatively be used.

The apparatus also includes a heater or heating element 30 that is in heat conducting contact with rework tool 20. Heating element 30 is typically a resistance heater that receives power through cable 32 from power control circuitry 34. Power control circuitry 34 controls the current flowing through resistance heater 30 so as to control the final temperature of the reworking tool 20. Although a resistance heating element applied to the bottom surface of reworking tool 20 is an effective and easily controlled heat source 30 for heating reworking tool 20 to a satisfactory temperature, it should be appreciated that any other type of heat source that can raise and maintain the reworking tool at a satisfactory temperature is acceptable for use with the invention and is intended to be covered by the claims. As an example, the heat source 30 should be sufficient to raise the temperature of the raised ribs 22a through 22h to a temperature of between about 150° C. and about 250° C. For most solder ball connections a temperature of between about 190° C. and about 200° C. (e.g., 190° C.) is preferred.

According to this embodiment of the invention, there is also included a structure for supporting reworking tool 20. According to one embodiment, structure supports reworking tool 20 at an angle with respect to the horizontal such that a front edge 38 is lower than back edge 40. In the embodiment shown in FIG. 2, this is accomplished by simply having back support legs 42 which are longer than the front support legs 44. It has been found that an angle of between 30° and 60° with respect to the horizontal is satisfactory, and an angle of about 30° is preferred.

Figure 3:
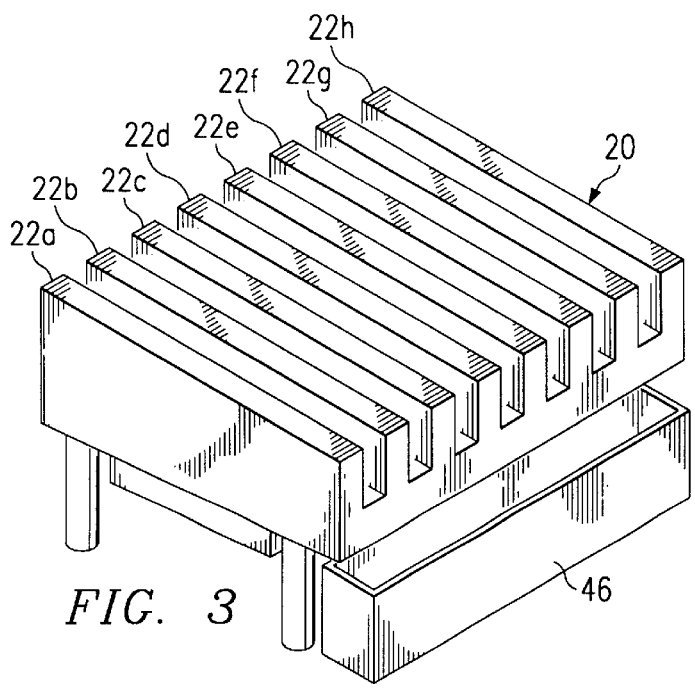
FIG. 3 shows another embodiment of the invention wherein the raised ribs are higher at one end and then decrease in height towards the other end so as to provide a tilted contact surface.

It will be appreciated, however, that obtaining a sloped or tilted contact surface may be accomplished other than be sloping the support structure. For example, as shown in FIG. 3, the raised ribs 22a through 22h of reworking tool 20a are themselves sloped such that the support structure can be level. Of course, if this embodiment is used, because of the greater distance that transferred heat must travel at the back of the rework tool with respect to the front of the tool, if the temperature of the contact surface is to be satisfactorily consistent, it may be necessary to provide more heating element toward the rear of the tool. This is because of the greater distance that heat must travel at the back of the rework tool than it must travel at the front of the tool.

Figure 4A:
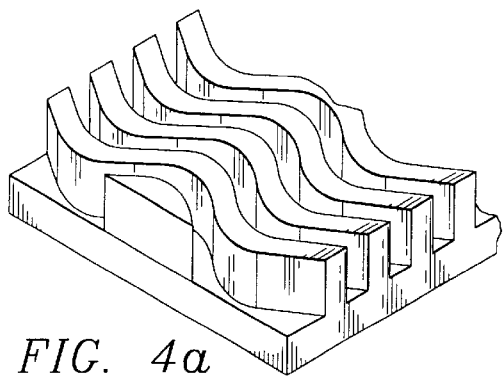
FIGS. 4a and 4b illustrate top view of different embodiments of raised rib structures defining a heated contact surface.
Figure 4B:
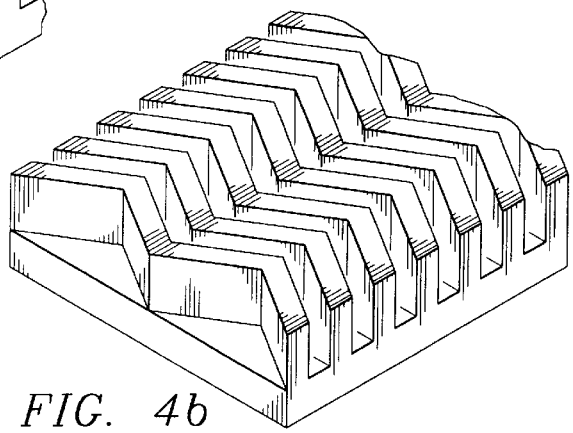

As seen in the embodiment of FIG. 2, the raised ribs which define the contact surface, or plane for transferring heat from rework tool 20 to the circuitry being reworked, are elongated parallel raised ribs, preferably spaced apart by a distance greater than the diameter of the individual solder ball connection. However, it will be appreciated that the raised ribs defining the contact surface may be substantially of any shape. FIGS. 4a and 4b illustrate examples of raised ribs that could be used. There are of course many other shapes that said ribs could also take that will work with the invention. The shapes illustrated in FIGS. 2, and 4a and 4b are for example only. A dripping bucket 46 is included to collect the melted solder as it runs off the front end of the raised ribs. Also as shown, a holding tool needs as a vacuum holding tool 48 provided for picking up the chips or circuits to be reworked and placing them against the heated rework tool.

Figure 5:
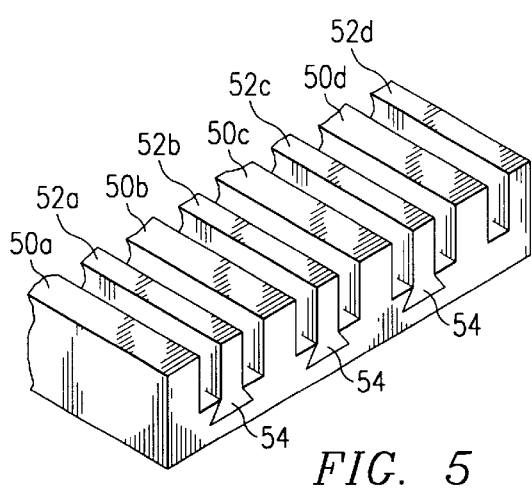
FIG. 5 illustrates an embodiment of the present invention having replaceable sharp-edged ribs and rounded heat transfer ribs.

Another, but somewhat more complex, reworking tool 20 is shown in FIG. 5 wherein the tool 20c includes two types of raised ribs. The first type of ribs are heating ribs 50a, 50b, 50c and 50d which have curved edges and may be made of a material having very high heat transfer characteristics. The second type, or scraping ribs 52a, 52b and 52c, may be made of a material which does not have as high heat transfer characteristics but is hard with rather sharp edges. In the embodiment shown, the heating ribs 50a, 50b, 50c and 50d may also be wider than the scraping ribs 52a, 52b and 52c so as to provide greater heating transfer surfaces. Also as shown, the scraping ribs 52 may be replaceable as indicated by the dovetail machine fit 54 of FIG. 5.

Figure 6:
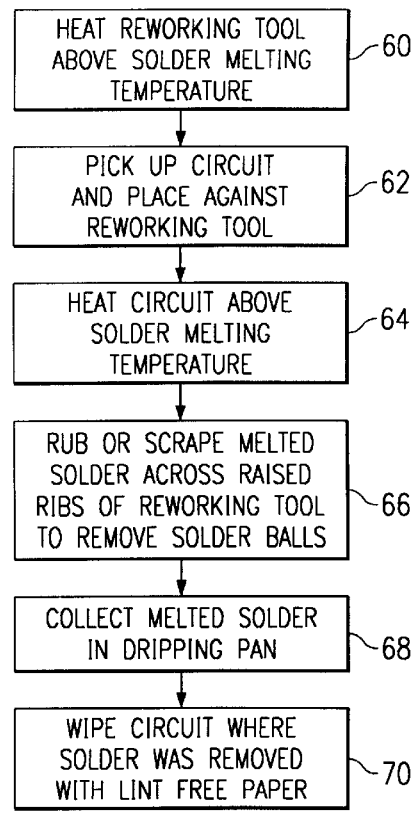
FIG. 6 is flow diagram illustrating the method of the present invention.

FIG. 6 is a flowchart showing method steps of the invention. As shown, the reworking tool 20 has a multiplicity of raised ribs that define a tilted contact surface. The raised ribs are heated to a temperature above the solder melting point as indicated at step 60, and the circuit having solder ball connections to be reworked is then placed against the contact face as indicated at step 62. It will be also appreciated that according to a preferred embodiment, solder flux material such as WS-600, commercially available from the Alphametals company of Singapore is applied to the solder ball connections prior to them being placed against the contact surface. The circuit is held against the contact surface for a period of time to allow sufficient heat to be transferred from the working tool 20 to the solder balls on the circuit so that the solder melts as indicated at step 64.

The circuit is then rubbed back and forth across the raised ribs (such as for example, three times) to knock the solder off of the circuit as shown at step 66. In a preferred embodiment, the solder then runs down the ribs and is collected in a dripping pan as indicated by step 68. Also in a preferred embodiment, wiping with a lint free paper as shown in step 70 cleans up the back of the circuit where the solder ball connections have been removed.

Thus, there has been described unique apparatus and methods of this invention for reworking solder ball connections on a circuit. However, although the invention has been described with respect to specific methods and apparatus, it is not intended that such specific references be considered limitations upon the scope of the invention except as is set forth in the following claims.

What is claimed is:

1. Apparatus for removing solder ball connections from electronic circuits comprising:

a solder ball removing tool having a multiplicity of raised ribs defining a contact surface tilted between about 30° and about 60° from the horizontal and made of a heat conductive material having a melting point above a melting point of the solder balls to be removed;

a heat source for heating at least a portion of said multiplicity of raised ribs to a temperature sufficient to melt solder and less than the melting point of said heat conductive material; and a support structure for supporting said solder ball removing tool such that melted solder runs along said multiplicity of said ribs and off of said tool.

2. The apparatus of claim 1 wherein said raised ribs are spaced apart a distance greater than the size of the solder balls to be removed.

3. Apparatus for removing solder ball connections from electronic circuits comprising:
- a solder ball removing tool having a multiplicity of elongated and parallel raised ribs defining a contact surface tilted between about 30° and about 60° from the horizontal and made of a heat conductive material having a melting point above a melting point of the solder balls to be removed;
- a heat source for heating at least a portion of said multiplicity of raised ribs to a temperature sufficient to melt solder and less than the melting point of said heat conductive material; and
- a support structure for supporting said solder ball removing tool.

4. The apparatus of claim 1 wherein said ball removing tool is shaped such that melted solder runs along said multiplicity of said ribs and off of said tool.

5. The apparatus of claim 1 wherein at least some of said raised ribs have a flat top surface.

6. The apparatus of claim 1 wherein at least some of said raised ribs have a curved top surface.

7. The apparatus of claim 3 wherein said multiplicity of heated raised ribs are heated to a temperature of between about 190° C. and about 200° C.

8. The apparatus of claim 1 wherein said multiplicity of raised ribs are heated to a temperature of between about 190° C. and about 200° C.

9. The apparatus of claim 1 wherein said heat conducting material is a metal selected from the group of aluminum, copper, iron and alloys thereof.

10. The apparatus of claim 1 and further comprising a holding tool for picking up a circuit having one side with a multiplicity of exposed solder ball connections and placing said side on said contact surface defined by said raised ribs.

11. The apparatus of claim 10 wherein said holding tool uses a vacuum to hold said circuit.

12. The apparatus of claim 1 wherein said support structure supports said solder ball-removing tool at an angle.

13. A method of reworking a circuit unit having one side with a multiplicity of exposed solder ball connections, the method comprising:
- heating a multiplicity of raised ribs defining a tilted contact surface;
- placing a circuit unit having a side with at least one exposed solder ball connection against said contact surface;
- transferring heat from one or more of said multiplicity of heated raised ribs to said solder ball connections and sufficient to melt said solder ball connections; and
- rubbing said circuit unit side against said heated raised ribs to remove said solder ball connections.

14. The method of claim 13 and further comprising the steps of applying flux to said at least one solder ball connection prior to said placing step.

15. The method of claim 14 further comprising repeating said method steps at least once.

16. The method of claim 14 wherein said step of applying flux comprises applying WS-600 flux.

17. The method of claim 13 wherein said heating step comprises heating to a temperature of between about 150° C. and about 250° C.

18. The method of claim 17 wherein said heating step comprises heating to a temperature of between about 190° C. and about 200° C.

19. The method of claim 13 further comprising using a vacuum tool to pick up said circuit for placing against said contact surface.

20. The method of claim 13 further comprising wiping said side having at least one exposed solder ball connection with a lint-free paper after said rubbing step.

21. The method of claim 13 wherein said tilted contact surface comprises the step of tilting said contact surface at an angle of between 30° and 60° from the horizontal.

* * * * *